US012561611B2

(12) United States Patent
Farooq et al.

(10) Patent No.: US 12,561,611 B2
(45) Date of Patent: Feb. 24, 2026

(54) METHOD FOR EFFICIENT DISTRIBUTED MACHINE LEARNING HYPERPARAMETER SEARCH

(71) Applicant: Telefonaktiebolaget LM Ericsson (publ), Stockholm (SE)

(72) Inventors: Hasan Farooq, Santa Clara, CA (US); Julien Forgeat, San Jose, CA (US); Meral Shirazipour, Santa Clara, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 750 days.

(21) Appl. No.: 17/995,300

(22) PCT Filed: Apr. 3, 2020

(86) PCT No.: PCT/IB2020/053231
§ 371 (c)(1),
(2) Date: Sep. 30, 2022

(87) PCT Pub. No.: WO2021/198742
PCT Pub. Date: Oct. 7, 2021

(65) Prior Publication Data
US 2023/0162089 A1　　May 25, 2023

(51) Int. Cl.
*G06N 20/00*　　　　(2019.01)
(52) U.S. Cl.
CPC .................................... *G06N 20/00* (2019.01)
(58) Field of Classification Search
CPC ..................................................... G06N 20/00
See application file for complete search history.

(56) References Cited

U.S. PATENT DOCUMENTS

2007/0100993 A1* 5/2007 Malhotra ............... G06Q 20/20
　　　　　　　　　　　　　　　　　　　709/224
2015/0046515 A1* 2/2015 Pei ..................... G06Q 30/0277
　　　　　　　　　　　　　　　　　　　709/203
(Continued)

OTHER PUBLICATIONS

A. P. Athreya et al., "Network Self-Organization in the Internet of Things," 2013, pp. 25-33, IEEE International Conference on Sensing, Communications and Networking (SECON).
(Continued)

*Primary Examiner* — Eliyah S. Harper
(74) *Attorney, Agent, or Firm* — Nicholson De Vos Webster & Elliott LLP

(57) ABSTRACT

A method of a hyperparameter server improves hyperparameter search efficiency for devices in a self-organizing network (SON) includes sending configuration for data feature collection to at least one edge device in the self-organizing network, receiving hyper-parameter performance data from the at least one edge device, and training a shared hyperparameter machine learning model using a global training database including the hyperparameter performance data to identify optimal hyperparameters for use by the at least one edge device. A further method of an edge device improves hyperparameter search efficiency for devices in a SON includes receiving configuration for data feature collection from a hyperparameter server, training an edge machine learning model using local training data and selected hyperparameters, and sending performance data to the hyperparameter server obtained from the training of the edge machine learning model.

18 Claims, 9 Drawing Sheets

(56) References Cited

U.S. PATENT DOCUMENTS

| | | | | |
|---|---|---|---|---|
| 2016/0162779 A1* | 6/2016 | Marcus | ............... | G06N 20/10 |
| | | | | 706/12 |
| 2017/0109322 A1 | 4/2017 | McMahan et al. | | |
| 2017/0185915 A1* | 6/2017 | Chawla | ............... | G06Q 30/02 |
| 2018/0032908 A1 | 2/2018 | Nagaraju et al. | | |
| 2018/0060738 A1* | 3/2018 | Achin | ............... | G06N 20/00 |
| 2018/0375720 A1* | 12/2018 | Yang | ............... | H04L 69/40 |
| 2019/0273509 A1* | 9/2019 | Elkind | ............... | G06N 3/08 |
| 2019/0273510 A1* | 9/2019 | Elkind | ............... | H03M 7/4093 |
| 2019/0297186 A1* | 9/2019 | Karani | ............... | G06Q 30/01 |
| 2020/0019888 A1* | 1/2020 | McCourt | ............... | G06N 20/00 |
| 2020/0184376 A1* | 6/2020 | Parameswaran | ....... | G06N 20/00 |
| 2021/0089937 A1* | 3/2021 | Zhang | ............... | G06N 5/04 |
| 2022/0156642 A1* | 5/2022 | Schmidt | ............... | G06N 20/00 |
| 2024/0394443 A1* | 11/2024 | Li | ............... | G06F 30/27 |

OTHER PUBLICATIONS

B. Hughes et al., "Generative Adversarial Learning for Machine Learning empowered Self Organizing 5G Networks," 2019, pp. 282-286, 2019 International Conference on Computing, Networking and Communications (CNC).

C. Svahn et al., "Inter-Frequency Radio Signal Quality Prediction for Handover, Evaluated in 3GPP LTE," 2019, pp. 1-5, 2019 IEEE 89th Vehicular Technology Conference (VTC2019-Spring).

F. B. Mismar et al., "Partially Blind Handovers for mmWave New Radio Aided by Sub-6 GHz LTE Signaling," 2018, pp. 1-5, 2018 IEEE International Conference on Communications Workshops (ICC Workshops).

F. Chen et al., "Federated Meta-Learning with Fast Convergence and Efficient Communication," Dec. 14, 2019, pp. 1-14, Computer Science and Machine Learning (ARXIV).

H. Ryden et al., "Predicting Strongest Cell on Secondary Carrier Using Primary Carrier Data," 2018, pp. 137-142, 2018 IEEE Wireless Communications and Networking Conference Workshops (WCNCW): 7th International Workshop on Self-Organizing Networks (IWSON).

International Preliminary Report on Patentability, PCT App. No. PCT/IB2020/053231, May 23, 2022, 19 pages.

International Search Report and Written Opinion, PCT App. No. PCT/IB2020/053231, Dec. 18, 2020, 13 pages.

J. Snoek et al., "Practical Bayesian Optimization of Machine Learning Algorithms," 2012, 9 pages, NIPS'2012.

M. Feurer et al., "Chapter 1, Hyperparameter Optimization," 2019, 31 pages, Automated Machine Learning, The Springer Series on Challenges in Machine Learning.

O. G. Aliu et al., "A Survey of Self Organisation in Future Cellular Networks," 2013, pp. 336-361, IEEE Communications Surveys & Tutorials, vol. 15, No. 1, First Quarter 2013.

P. V. Klaine et al., "A Survey of Machine Learning Techniques Applied to Self-Organizing Cellular Networks," 2017, pp. 2392-2431, IEEE Communications Surveys & Tutorials, vol. 19, No. 4, Fourth Quarter 2017.

Written Opinion of the International Preliminary Examining Authority, PCT App. No. PCT/IB2020/053231, Feb. 23, 2022, 11 pages.

Y. Yang et al., "Generative-Adversarial-Network-Based Wireless Channel Modeling: Challenges and Opportunities," Mar. 2019, pp. 22-27, IEEE Communications Magazine, vol. 57, No. 3.

* cited by examiner

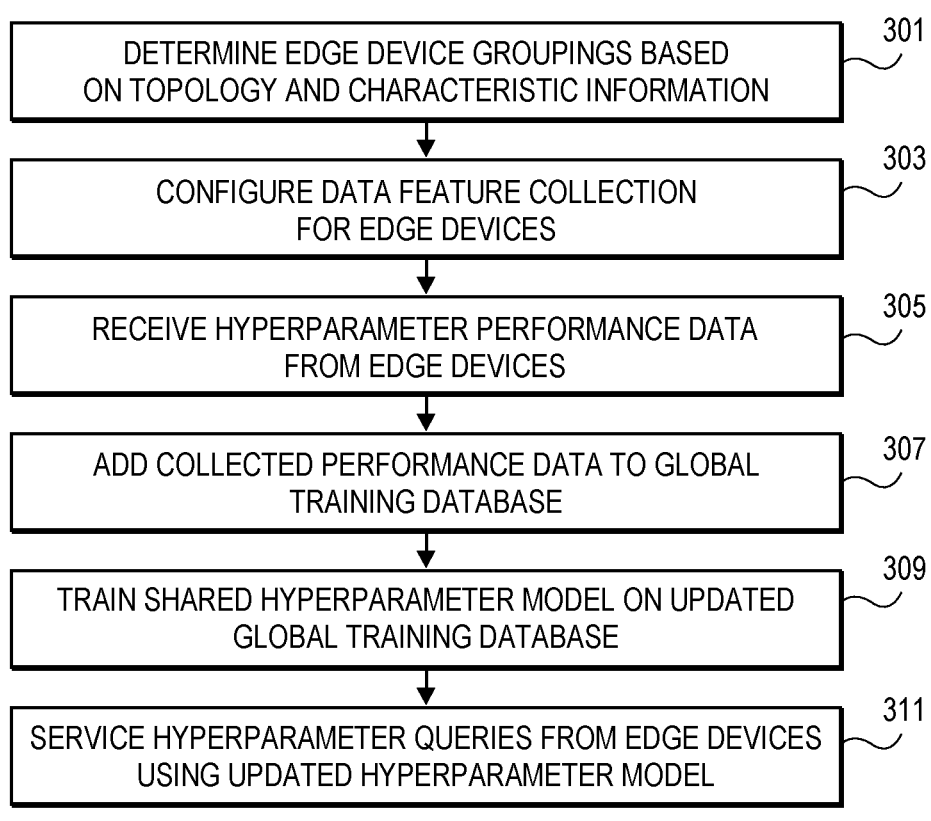

| DETERMINE EDGE DEVICE GROUPINGS BASED ON TOPOLOGY AND CHARACTERISTIC INFORMATION | 301 |
| CONFIGURE DATA FEATURE COLLECTION FOR EDGE DEVICES | 303 |
| RECEIVE HYPERPARAMETER PERFORMANCE DATA FROM EDGE DEVICES | 305 |
| ADD COLLECTED PERFORMANCE DATA TO GLOBAL TRAINING DATABASE | 307 |
| TRAIN SHARED HYPERPARAMETER MODEL ON UPDATED GLOBAL TRAINING DATABASE | 309 |
| SERVICE HYPERPARAMETER QUERIES FROM EDGE DEVICES USING UPDATED HYPERPARAMETER MODEL | 311 |

FIG. 3A

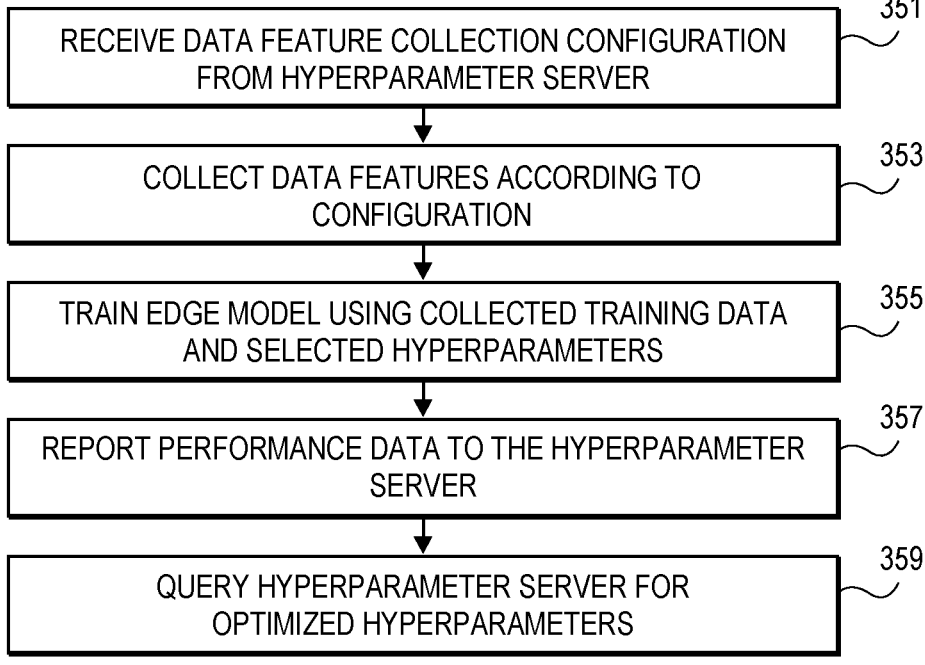

| RECEIVE DATA FEATURE COLLECTION CONFIGURATION FROM HYPERPARAMETER SERVER | 351 |
| COLLECT DATA FEATURES ACCORDING TO CONFIGURATION | 353 |
| TRAIN EDGE MODEL USING COLLECTED TRAINING DATA AND SELECTED HYPERPARAMETERS | 355 |
| REPORT PERFORMANCE DATA TO THE HYPERPARAMETER SERVER | 357 |
| QUERY HYPERPARAMETER SERVER FOR OPTIMIZED HYPERPARAMETERS | 359 |

Group 2

Group 1

Group 3

HYPERPARAMETER
SERVER IN CLOUD

601

603

Base Station

SON ML model

Extract Probability Distribution features

Network Data

Training database

Hyperparameter ML model

Heuristic Search Algorithm

Hyperparameter server in
Cloud/Core

FIG. 7A

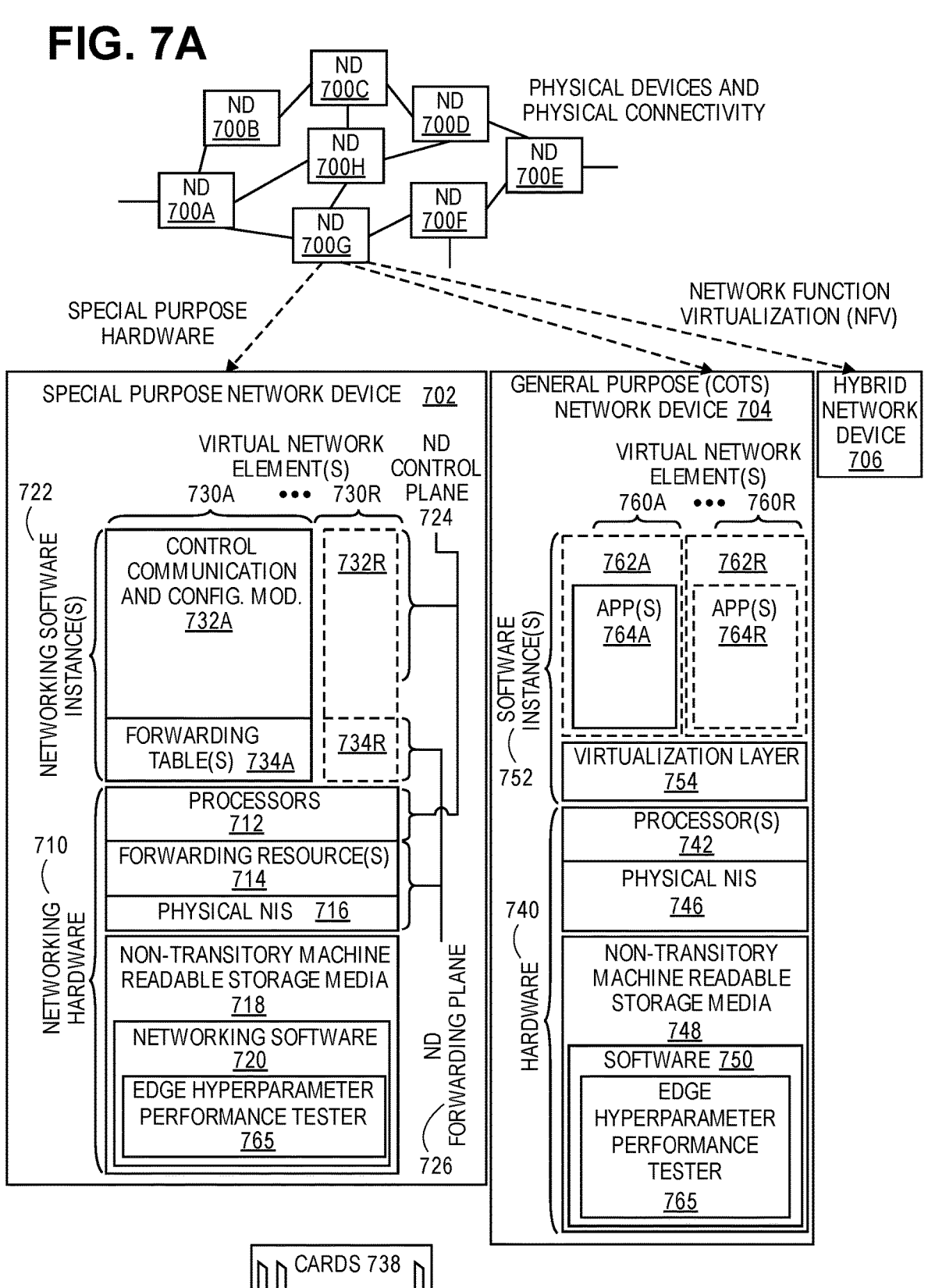

PHYSICAL DEVICES AND PHYSICAL CONNECTIVITY

ND 700C
ND 700B
ND 700D
ND 700H
ND 700A
ND 700E
ND 700G
ND 700F

SPECIAL PURPOSE HARDWARE

NETWORK FUNCTION VIRTUALIZATION (NFV)

SPECIAL PURPOSE NETWORK DEVICE 702

VIRTUAL NETWORK ELEMENT(S)    ND CONTROL PLANE 724
730A  •••  730R

722

NETWORKING SOFTWARE INSTANCE(S)

CONTROL COMMUNICATION AND CONFIG. MOD. 732A    732R

FORWARDING TABLE(S) 734A    734R

PROCESSORS 712

FORWARDING RESOURCE(S) 714

PHYSICAL NIS 716

710

NETWORKING HARDWARE

NON-TRANSITORY MACHINE READABLE STORAGE MEDIA 718

NETWORKING SOFTWARE 720

EDGE HYPERPARAMETER PERFORMANCE TESTER 765

ND FORWARDING PLANE 726

GENERAL PURPOSE (COTS) NETWORK DEVICE 704

HYBRID NETWORK DEVICE 706

VIRTUAL NETWORK ELEMENT(S)
760A  •••  760R 762A    762R

APP(S) 764A    APP(S) 764R

SOFTWARE INSTANCE(S)

752

VIRTUALIZATION LAYER 754

PROCESSOR(S) 742

PHYSICAL NIS 746

740

HARDWARE

NON-TRANSITORY MACHINE READABLE STORAGE MEDIA 748

SOFTWARE 750

EDGE HYPERPARAMETER PERFORMANCE TESTER 765

CARDS 738
•••
BACKPLANE 736

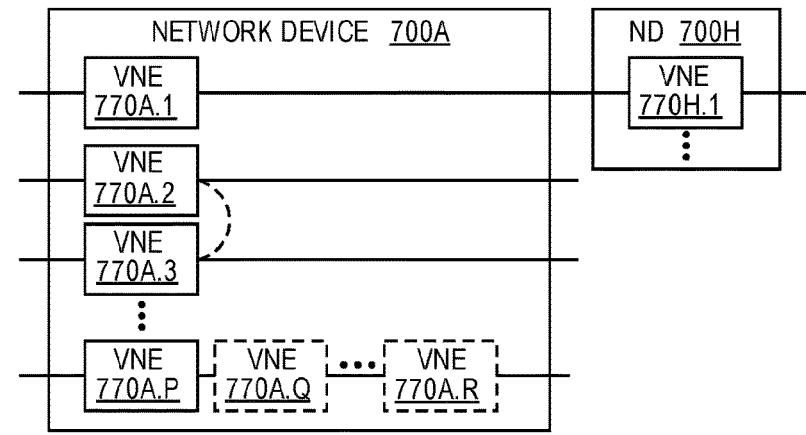

NETWORK DEVICE 700A

VNE 770A.1

VNE 770A.2

VNE 770A.3

VNE 770A.P    VNE 770A.Q    ...    VNE 770A.R

ND 700H

VNE 770H.1

FIG. 7D

CENTRALIZED APPROACH (SDN) 774

DISTRIBUTED APPROACH 772

...

APPLICATION(S) 788

APPLICATION LAYER 786

NORTH BOUND INTERFACE 784

VIRTUAL NETWORK(S) 792

CENTRALIZED CONTROL PLANE 776

NETWORK CONTROLLER 778

CENTRALIZED REACHABILITY AND FORWARDING INFO. MOD. 779

HYPERPARAMETER SERVER 781

...    SOUTH BOUND INTERFACE 782

DATA PLANE 780

SINGLE VNE 770T

ND 700A

VNE 770A.1

ND 700H

VNE 770H.1

METHOD FOR EFFICIENT DISTRIBUTED MACHINE LEARNING HYPERPARAMETER SEARCH

CROSS-REFERENCE TO RELATED APPLICATIONS

This application is a National stage of International Application No. PCT/IB2020/053231, filed Apr. 3, 2020, which is hereby incorporated by reference.

TECHNICAL FIELD

Embodiments of the invention relate to the field of machine learning; and more specifically, to the determination of hyperparameters in machine learning.

BACKGROUND ART

Machine learning is an area of artificial intelligence (AI) in the field of computer science that applies algorithms and statistical models that are not task specific to perform specific tasks without the use of instructions that are specific to the task to be performed. The algorithms and statistical models can employ pattern recognition, inference, and similar techniques to perform a task rather than specific instructions for the task. Many machine learning algorithms build a model based on training data. Training data can be a set of sample or starting data with known properties such as correlation with a task outcome. The training data is input into the algorithm and model to 'train' the AI to perform a task. Machine learning algorithms can be applied to tasks or applications, such as email management or image recognition, where it is difficult or infeasible to develop a conventional algorithm to effectively perform the task.

In the context of machine learning, a hyperparameter is a parameter whose value is set before the training process begins. By contrast, the values of other parameters are derived from the training process. Hyperparameters can include model hyperparameters that cannot be inferred while 'fitting' a model to a training set because the model hyperparameters relate to a model selection or configuration task. Hyperparameters can also include algorithm hyperparameters that do not directly influence the output of the model but affect the speed and quality of the learning process. An example of the model hyperparameters is a topology and size of a neural network. An example of the algorithm hyperparameter is learning rate or mini-batch size.

Different model training algorithms utilize different hyperparameters. Some simple machine learning algorithms may have few or no hyperparameters. Using the hyperparameters, the training algorithm learns the parameters from the training data. Determining hyperparameter values is a manual process that is slow and unresponsive to changing conditions.

SUMMARY

In one embodiment, a method of a hyperparameter server improves hyperparameter search efficiency for devices in a self-organizing network. The method includes sending configuration for data feature collection to at least one edge device in the self-organizing network, receiving hyperparameter performance data from the at least one edge device, and training a shared hyperparameter machine learning model using a global training database including the hyperparameter performance data to identify optimal hyperparameters for use by the at least one edge device.

In another embodiment, a method of an edge device improves hyperparameter search efficiency for devices in a self-organizing network. The method includes receiving configuration for data feature collection from a hyperparameter server, training an edge machine learning model using local training data and selected hyperparameters, and sending performance data to the hyperparameter server obtained from the training of the edge machine learning model.

In a further embodiment, a non-transitory machine-readable storage medium that provides instructions that, if executed by a processor, will cause said processor to perform operations is provided where the operations include sending configuration for data feature collection to at least one edge device in the self-organizing network, receiving hyperparameter performance data from the at least one edge device, and training a shared hyperparameter machine learning model using a global training database including the hyperparameter performance data to identify optimal hyperparameters for use by the at least one edge device.

In one embodiment, a non-transitory machine-readable storage medium that provides instructions that, if executed by a processor, will cause said processor to perform operations is provided where the operations include receiving configuration for data feature collection from a hyperparameter server, training an edge machine learning model using local training data and selected hyperparameters, and sending performance data to the hyperparameter server obtained from the training of the edge machine learning model.

BRIEF DESCRIPTION OF THE DRAWINGS

The invention may best be understood by referring to the following description and accompanying drawings that are used to illustrate embodiments of the invention. In the drawings:

FIG. 3A is a flowchart of one embodiment of the operation of a hyperparameter server.

FIG. 3B is a flowchart of one embodiment of the operation of an edge device.

FIG. 4 is a diagram of one embodiment of an edge device and hyperparameter server executing aspects of the hyperparameter optimization process.

FIG. 7A illustrates connectivity between network devices (NDs) within an exemplary network, as well as three exemplary implementations of the NDs, according to some embodiments of the invention.

FIG. 7B illustrates an exemplary way to implement a special-purpose network device according to some embodiments of the invention.

FIG. 7C illustrates various exemplary ways in which virtual network elements (VNEs) may be coupled according to some embodiments of the invention.

FIG. 7D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 7E illustrates the simple case of where each of the NDs implements a single NE, but a centralized control plane has abstracted multiple of the NEs in different NDs into (to represent) a single NE in one of the virtual network(s), according to some embodiments of the invention.

FIG. 7F illustrates a case where multiple VNEs are implemented on different NDs and are coupled to each other, and where a centralized control plane has abstracted these multiple VNEs such that they appear as a single VNE within one of the virtual networks, according to some embodiments of the invention.

DETAILED DESCRIPTION

Figure 1:
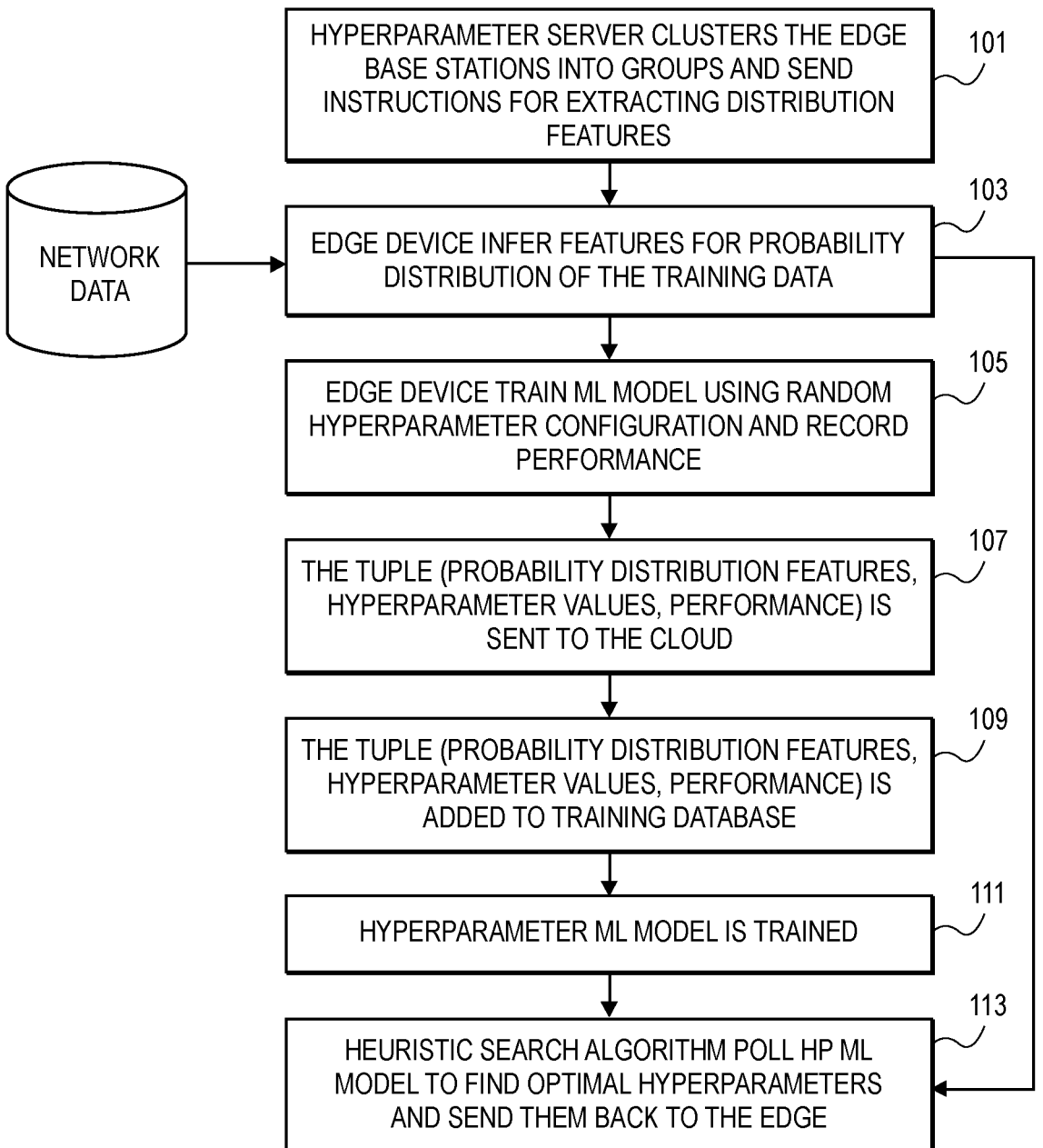
FIG. 1 is a diagram of one embodiment of a process for hyperparameter optimization.

The following description describes methods and apparatus for an automated process for determining hyperparameters for a machine learning (ML) model and/or algorithm. The automated process can be applied to self-organizing networks (SON) and similar applications. The embodiments provide an efficient process to identify optimal hyperparameters for edge devices. The optimal hyperparameters are identified by a process implemented at a hyperparameter server and edge devices in a communication network. The edge devices maintain local ML models and evaluate hyperparameter performance that is reported to the hyperparameter server. The hyperparameter server collects the data from the edge devices and maintains a shared ML model. The shared ML models is used to determine optimal hyperparameters that can then be queried by edge devices to obtain optimal hyperparameters for use at the edge devices.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set of one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Introduction

The embodiments are described with application to automation of mobile networks by way of example and not limitations. One skilled in the art would appreciate that the methods, structures, and techniques described herein can be applied in other contexts including other types of networks or communication systems. The successful realization of a zero-touch automation of mobile networks (i.e., a completely autonomous mobile network) for reducing operational expenses, enhancing quality of experience, and maximizing resource efficiency hinges on machine learning empowered self-organizing functions. Machine learning (ML) techniques can leverage big data collected from mobile networks including performance metrics, counters, and key performance indicators to model spatiotemporal network behavior that in turn can be used to self-configure, self-optimize, self-heal, and self-manage the network with no or minimal human involvement. Networks employing these techniques are referred to herein as self-organizing network (SONs). For ML driven SON functions, an important design question is to choose what the best place (i.e., in which machine(s) and location(s) in a network) is to learn and to optimize network performance. This choice is influenced by a number of factors like latency, compute/memory/ data-availability/privacy requirements, and similar factors. Distributed SONs, where inference and similar learning is distributed at the edges, are attractive in terms of latency/ signaling cost reduction. For example, this can be advantageous for meeting 5G quality of experience and latency requirements. A centralized SON is attractive when global knowledge of the network is needed.

One example of a ML SON use case is mobility robustness optimization (MRO). MRO is a use case with high agility requirements. MRO is a process for enhancing the mobility experience (i.e., the experience of using handheld mobile devices in a mobile network) for users that can be implemented in a distributed way. In communication networks with different frequency bands allocated to the base stations of the communication network, User Equipments (UEs) connected to the communication network must periodically scan for suitable cells in their vicinity for connecting to base stations that provide the highest data rates. Denser communication networks and more frequencies make it challenging to ensure the best possible cell and frequency carrier assignment to a UE without the UE needing to perform an excessive amount of inter-frequency measurements and reporting. This measurement issue affects throughput as well as the energy consumption of the UEs. An ML driven MRO SON solution can circumvent this issue by training on historical UE measurements to predict the strongest cell of a secondary carrier based on only measurements of the serving carrier.

However, in mobile communication networks attempts to implement ML powered zero touch (i.e., no manual/administrative involvement) automation are hampered by a few fundamental challenges. The first challenge is high signaling/latency cost attributed to the transport of essential training data (i.e., large training data set) from edge devices to the cloud. If ML driven SON functions are based on centralized architecture where intelligence resides in a centralized place like a core, then all network data (e.g., performance counters, key performance indicators (KPIs) and similar data) is transferred from edge devices to core devices where machine learning models are trained and then used for inference. Although centralized core devices have sufficient memory/compute resources available for training ML based SON algorithms, this resource availability of the core devices comes with the added cost of high bandwidth requirements and high latency issues for transporting large data sets from the edge devices to the core devices (e.g., a cloud computing network or similar centralized set of computing resources). Alternatively, a paradigm of distributed ML can be utilized wherein model training is done in the core similar to centralized ML but inference is done at the edge devices. This approach can reduce latency by bringing inference close to the edge devices however training data still needs to be transported to the core devices for the machine learning training stage. This problem of transporting a large amount of training data can be exacerbated in 5G communication networks, where diversity in service requirements and high density and variety of cells means the dynamics of the cellular eco-system will be even more demanding of the frequent transport of necessary training data to the core devices.

The second challenge in implementing ML powered zero touch automation in a communication network is the high space/time complexity of the hyperparameter search. Even before the training of the ML model can begin, designing and tuning the hyperparameters of the ML model or algorithm to deliver reliable performance in the presence of the dynamics that are a hallmark of mobile communication networks remains more of an art than science. Every ML model has hyperparameters that are the training variables that are set to a pre-determined value before starting the training of the ML model. This hyperparameter tuning can create differences between generating a non-performing ML model to generating an ML model with state of art performance. For a machine learning algorithm having Z hyperparameters, if $C_m$ is the domain of the mth hyperparameter, then the overall hyperparameter configuration space will be $C=C_1 \times C_2 \times \ldots C_z$. ML models often have a very the large number of initialization and tuning parameters and the domain of hyperparameter search can be very complex like real-valued (e.g., learning rate), integer-valued (e.g., number of layers), binary (e.g., whether to use early stopping or not), categorical (e.g., choice of optimizer) or similar complexity issues. Furthermore, function evaluations can be extremely expensive for large ML models, complex machine learning pipelines, or large data sets. Thus, the time-consuming nature together with a typically vast and complex parameter space to be explored, make a traditional hyperparameter search exhaustive when the data is large and many training iterations need to be performed before a good set of hyperparameters is found. This issue of hyperparameter searching can become a bottleneck in meeting the low latency requirements of 5G communication networks.

A third challenge relates to the sparsity or scarcity of training data. The success of ML driven SON functions hinges on the availability of sufficient training data. However, there might be cases where training data is not available. For example, insufficient training data may be available in a case of a self-configuration network, when a new base station is deployed, when a new carrier is configured, or in small cells with a low number of active sessions. In such cases, the ML model cannot be properly trained due to the lack of training data and hyperparameter optimization cannot be performed unless sufficient training data becomes available.

The prior art approaches to these challenges have many disadvantages. While generative machine learning models that can learn probability distribution of the dataset have been used for generating synthetic communication network data for coping with training data sparsity issues, however they have not been adapted for the context of minimizing training data transmission in the network and learning distribution of features for developing resource efficient globally shared hyperparameter search models. Several hyperparameter search optimization strategies have been proposed to find optimal hyperparameters, however, all of them are based on an iterative design involving multiple rounds of passing training datasets through machine learning models and finding the best performing model parameters. Bayesian optimization uses a probabilistic model to model the objective function based on the set of already observed data points. Bayesian optimization uses an acquisition function based on the current model to identify promising new configurations. The embodiments overcome the deficiencies of the prior art by providing a globally shared hyperparameter machine learning model based on underlying distribution of the data instead of actual training data samples. In this way, the ML model can be re-used by different edge SON ML models. The embodiments reduce the amount of training data that is transferred from edge devices to core devices as well as the time needed to find optimal hyperparameters.

The embodiments provide a method that is based on the notion that if training datasets distributed at different edge devices have the same distribution and the same class of ML models, then the ML models trained on those datasets should have similar optimal hyperparameter values. The embodiments include a method for extracting underlying distribution of the training data (e.g., using statistical measures, parametric, or non-parametric distribution fitting methods) to learn the underlying distribution of the training data available at the edge devices. This knowledge of underlying distribution of the training data along with the hyperparameters used and the resulting performance is sent to the cloud where this tuple (probability distribution, hyperparameter settings, and performance) is used for training a globally shared ML model (hyperparameter ML model). A heuristic search agent consisting of state-of-art heuristic search techniques polls this hyperparameter ML model and returns the optimal hyperparameter values back to the edge devices.

The embodiments provide many advantages over the prior art. The advantages of the embodiments include enabling training of ML based SON models without requiring the transport of big training data sets from edge devices to the core devices, enabling the finding of optimal hyperparameters with a small time complexity, enabling the use of training data distributed at the edge devices, enabling the meeting of 5G requirements of high payload capacity and low latency by reducing signaling load and latency, and enabling communication networks to cope with scarcity/sparsity of the training data by enabling correlated cells with scarcity of training data to obtain optimized hyperparameters based on a hyperparameter ML model.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Figure 2:
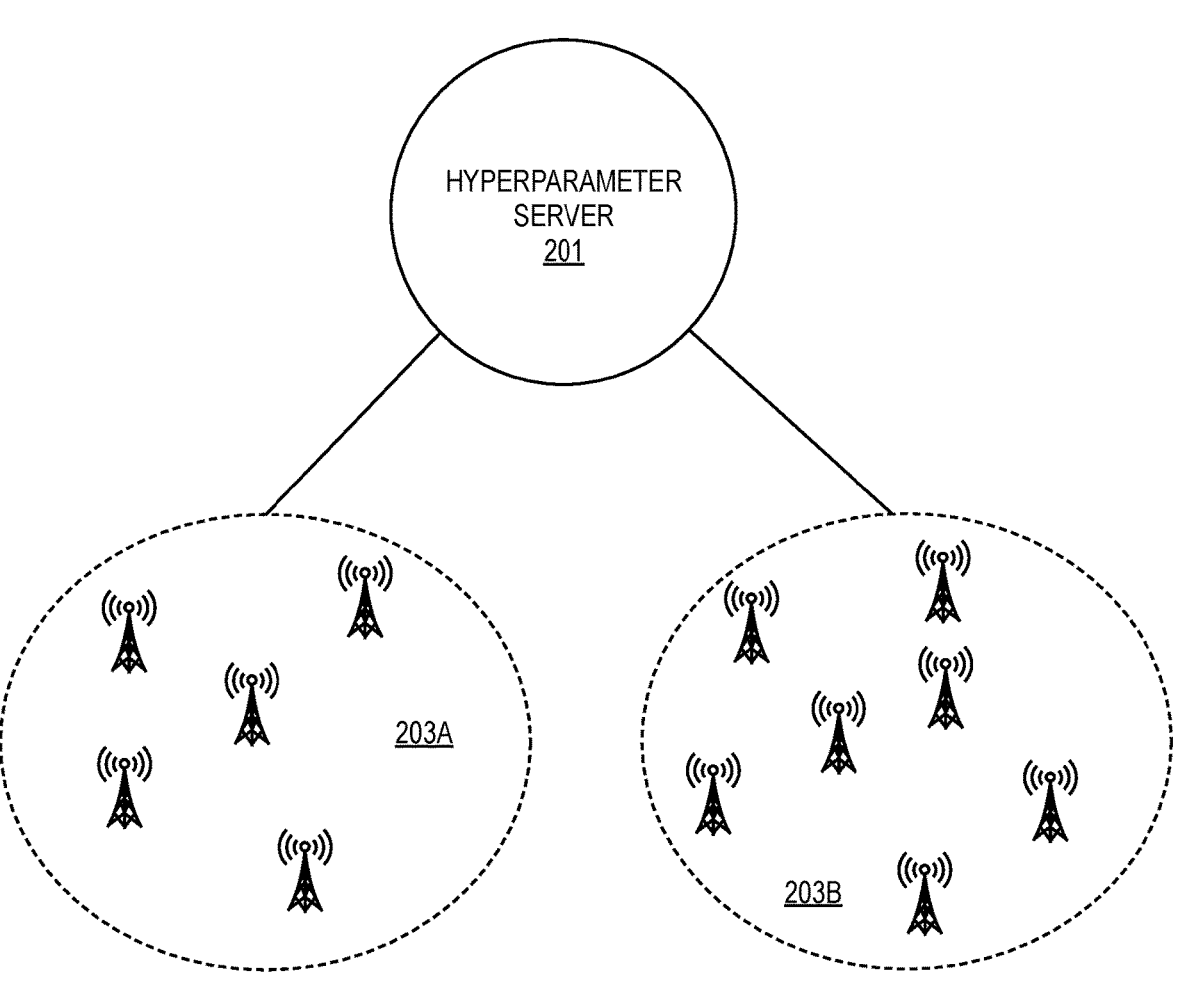
FIG. 2 is a diagram providing an example communication network structure.

FIG. 1 is a diagram of one embodiment of a process for hyperparameter optimization. The hyperparameter optimization process can be implemented by devices in the core (e.g., a hyperparameter server) and edge devices. The hyperparameter server has knowledge of a topology of a communication network and can group (i.e., cluster) edge devices such as base stations based on their characteristics, location, and similar characteristics. FIG. 2 is a diagram providing an example communication network structure. The diagram of FIG. 2 illustrates the grouping process (Block 101) of the overall hyperparameter optimization process. In one embodiment, the hyperparameter server 201 will first cluster the edge devices into groups based upon some defined decision metric e.g., base stations can be grouped depending upon the locality so base stations serving nearby regions can be grouped into one being served by a cluster (e.g., clusters 203A and 203B). For each group a cluster is defined at the hyperparameter server that includes a separate hyperparameter ML model that will be trained by the hyperparameter server.

Returning to FIG. 1, the process continues with the hyperparameter server instructing all base stations to utilize a specific scheme for extracting and encoding distribution features. Distribution features, as used herein refer to dataset features that are designed to extract general properties and able to characterize datasets. Examples of such schemes can include finding statistical measures, fitting parametric distribution models, training non-parametric generative models and similar schemes. Finding statistical measures involves finding statistical measures of the input data (e.g., correlation, p-values of features and similar features) by the edge devices and using them as distribution features. For example, $[D_{data}]=$[Number of features having correlation>0.5 with output label, p-test value, Sparsity ratio]. Fitting parametric distribution models involves using the model parameters and the fitting error as distribution features. For example, assuming "gamma" distribution is selected with parameters $\alpha$ and $\beta$ then: $[D_{data}]=[\alpha_1$ for $1^{st}$ feature 1, $\beta_1$ for $1^{st}$ feature, $\ldots$, $\alpha_n$ for nth feature, $\beta_n$ for nth feature]. Training non-parametric generative models involves using the structure information (weights, biases) of a trained generative model as distribution features. For example, if a generative adversarial network (GAN) is used to learn probability distribution of the data then $[D_{data}]=$[[Vector of Weights of Generator], [Vector of Biases of Generator]].

The choice of scheme for extracting and encoding distribution features can depend upon the priority of base stations in the cluster. For clusters with resource constrained devices or experiencing high load, extracting statistical features can be more beneficial as compared to training GANs. For the fitting parametric distribution model scheme, in the initial phase, each node in the network can try some number of distributions and send their results to the server. Based on the results, the hyperparameter server can pick one common distribution that will be used by all nodes in that cluster. For the training non-parametric generative model scheme, a common topology for the generative machine learning model and initial seed can be used by all nodes in that cluster.

For ML SON use cases, wherein a number of training features and input data vary among distributed nodes, feature selection can be done to make a number of features the same among all distributed nodes (e.g., a hyperparameter server will instruct cluster nodes to first perform Principal Component Analysis (PCA) on their datasets with some agreed number of components to make feature dimensions the same among all the nodes of a cluster).

After the hyperparameter server has defined clusters and provided instructions for extracting distribution features, the edge devices in the clusters begin compiling the distribution features (Block 103). In one example, $[X_{data}]$ is the training data available at each of the edge devices (e.g., base stations) in a cluster that will be used for extracting and encoding distribution features. The $[X_{data}]$ can be a matrix of historical data $[X_{data}]_{T \times (F+L)}$ where T is size of historical time window i.e., number of observations, F is number of input features and L is number of output labels. All cluster nodes (i.e., each edge device in the cluster that collects data) will follow the same scheme as communicated by the hyperparameter server and will produce distribution features $[D_{data}]_{1 \times M} = [[D_1][D_2], \ldots, [D_M]]_{1 \times M}$ representing probability distribution of their training data $[X_{data}]$. Note that M is not necessarily equal to F+L.

Each edge device (e.g., each base station) will then train an edge ML model using the collected training data (Block 105). In some embodiments, the edge ML model (e.g., XGBoost) is trained using training data $[X_{data}]$ with some random hyperparameter configuration $c \in C$ where C is set of hyperparameters (e.g., number of leaves, bagging frequency, learning rate, or similar hyperparameters) and then records the ML model performance $p \in P$ where P is set of performance metrics (e.g., Area under curve, F1 score, and similar performance metrics).

The edge devices (e.g., base stations) sends the collected data, configuration information, and performance information to the hyperparameter server (Block 107). The information sent to the hyperparameter server can be in the form of the tuple $\{D_{data}, c, p\}$. The information includes distribution features, hyperparameter configuration used, and ML model performance. For example, assuming scheme (a) is used with XGBoost as classifier/regressor than tuple can be tuple={[p-test value, Sparsity ratio], [number of leaves, bagging frequency, learning rate], [AUC]]}.

The hyperparameter server collects the data from each cluster and/or each edge device (Block 109). For example, the tuple coming from various edge devices in the network can be appended to the training database with training data distribution and hyperparameter values as input features and resulting performance as the output label i.e., $[X_{train}] = [[D_{data}, c][p]]$. The compiled dataset $[X_{train}]$ is then used by the hyperparameter server to train a globally shared ML hyperparameter model for each cluster (Block 111). In one embodiment, the global ML model will be trained to learn with the function $f: [D_{data}, c] \rightarrow p$. The function does not necessarily have to be an ML model to learn this mapping. An If-else based rule can also be leveraged in some embodiments.

With the global ML model updated, the hyperparameter server can be queried to obtain optimized hyperparameters by an edge device in a cluster (Block 113). Any state-of-the art heuristic search algorithm (e.g., genetic algorithm, coordinate descent search, or similar algorithm) that polls this shared hyperparameter ML model with the requested distribution feature values $[D_{data}]$ from the edge device (e.g., a base station) while varying hyperparameter values c can find the appropriate optimized hyperparameters that are returned to the requesting edge device. For example, $$\max_{c} P(c)$$

subject to $D_{data}$ Once optimal hyperparameter settings are found, they are sent back to the requesting edge device. These hyperparameters are then used by the SON ML model in the edge device (e.g., base station).

FIGS. 3A and 3B describe the operation of the process as implemented by the hyperparameter server and the edge devices respectively. FIG. 3A is a flowchart of one embodiment of the operation of a hyperparameter server. In one embodiment, the hyperparameter server determines a set of groupings for edge devices in the communication network (Block 301). The communication network can have any number and variety of edge devices. The hyperparameter server can access topology information, device characteristics information, and similar information to identify commonalities between the edge devices to form the basis of the groups or clusters. In some embodiments, the clusters are identified such that edge devices in the cluster can be assumed to share optimal hyperparameters with other edge devices in the cluster due to the commonalities between the edge devices. The hyperparameter server can then send instructions to configure the data feature collection of each edge device in each cluster (Block 303). The data feature collection can be based on a set of schemes as set forth herein above such as schemes to find statistical measures, schemes to fit parametric distribution models, schemes to train non-parametric generative models and similar schemes. The configuration of each edge device can be specific to the edge device based on its specific characteristics and based on the cluster it belongs to. In other embodiments, the edge devices in each cluster share a common or similar configuration for data feature collection.

After the data feature collection configuration is complete for each edge device, the hyperparameter server will begin to receive hyperparameter performance data from each of the configured edge devices (Block 305). The performance data provides feedback on how tested hyperparameters performed on collected distribution feature data at the edge device. This information can be provided as a unit (e.g., a tuple) of the performance metrics, the hyperparameters tested, and the distribution feature data.

The hyperparameter server collects the performance data into a global training database (Block 307). This global training database can have any format or organization. An example is discussed herein above in relation to FIG. 2. The updated global training database is utilized to train a shared hyperparameter model for each cluster (Block 309). Each cluster has a separate shared hyperparameter model that is trained on the training data to determine optimal hyperparameters for the associated cluster. Once the shared hyperparameter model has been trained, then the hyperparameter server can service queries from edge devices to provide optimal hyperparameters according to the associated cluster of the requesting edge device.

FIG. 3B is a flowchart of one embodiment of the operation of an edge device. In one embodiment, the edge device can be any type of communication network device such as a base station or similar radio access network (RAN) or cellular communication network component. The edge device receives instructions from a hyperparameter server to configure the data feature collection of the edge device (Block 351). The data feature collection can be based on a set of schemes as set forth herein above such as schemes to find statistical measures, schemes to fit parametric distribution models, schemes to train non-parametric generative models and similar schemes. The configuration of the edge device can be specific to the edge device based on its specific characteristics and based on the cluster it belongs to. In other embodiments, the edge device receives a configuration for its cluster where it shares a common or similar configuration for data feature collection with other edge devices in the cluster.

After the data feature collection configuration is received, the edge device begins to collect or compile the distribution features (Block 353). The collected distribution features are extracted or encoded based on local training data collected by or available to the edge device. The edge device maintains an edge ML model that is trained on the local training data using any combination of selected hyperparameters and the performance of the edge ML model and the edge device are recorded as performance metrics (Block 355). The performance data provides feedback on how tested hyperparameters performed on the training data at the edge device. The performance data can then be reported to the hyperparameter server (Block 357). The performance data can be provided as a unit (e.g., a tuple) of the performance metrics, the hyperparameters tested, and the associated distribution feature data. This combination of feedback information enables the collection of distributed feedback without having to transfer the entire training data set from the edge device to the hyperparameter server.

The edge device can then query the hyperparameter server to obtain optimal hyperparameters according to the associated cluster of the requesting edge device, where the optimal hyperparameters are derived from a shared hyperparameter model for the cluster that is updated by the hyperparameter server as set forth herein above. (Block 359).

Figure 4:
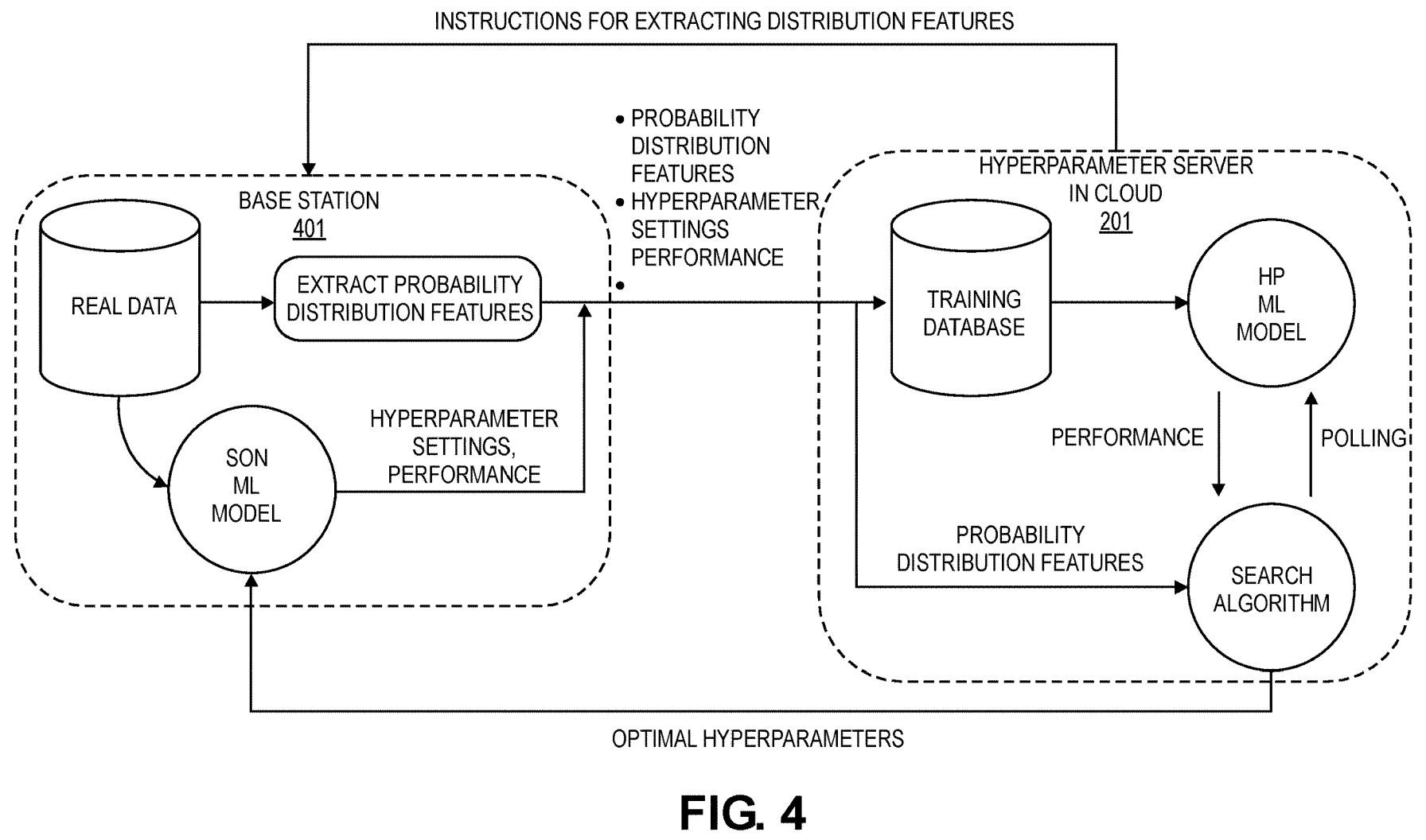

FIG. 4 is a diagram of one embodiment of an edge device and hyperparameter server executing aspects of the hyperparameter optimization process. The diagram illustrates an example where the hyperparameter server 201 operates in conjunction with a base station 401 to determine and provide optimal hyperparameters to the base station 401. The hyperparameter server sends instructions to the edge base station 401 to extract distribution features. The base station 401 will find statistical distribution features (meta-features) of their training dataset (real data) and perform hyperparameter tuning with some random configuration. In some embodiments, only one or few trials are performed by the base station 401. The base station 401 then sends this information (dataset meta-features, hyperparameter configuration, performance metrics) to the hyperparameter server (e.g., operating in a cloud) wherein this information coming from all edge base stations is compiled to form a dataset in the training database with dataset meta-features and hyperparameter configuration as input features and corresponding performance metrics (area under curve (AUC)) as the predicted value (regression). This dataset is utilized to train a global hyperparameter (HP) ML model that will be able to predict performance (AUC) for a given dataset meta-features and hyperparameter configuration. Once this dataset is compiled from a sufficient number of edge devices in a cluster then the hyperparameter server can performed training for the HP ML model. Prior to training, the edge base stations will send their dataset meta-features (they will not perform any hyperparameter optimization) and those will be used by the heuristic search algorithm to poll this trained hyperparameter ML model to get optimal hyperparameters that are sent back to the edge base station 401. The frequency with which the edge base station 401 can request optimal hyperparameters can be configured and can have any frequency or interval.

In one example case, the embodiments can be applied to a Secondary Carrier Prediction (SCP) SON feature use. For a total of 95 datasets available each corresponding to a specific pair of cell and target frequency, and where LightGBM is used as the ML model and performed state-of-the-art hyperparameter optimization using Tune library built on top of Ray, the following hyperparameters were considered: Bagging Freq: {2, 5, 10}; Max bin: {127, 255}; Min data in leaf: {25, 50}; Num iterations: {100, 200}; Num leaves: {31, 63, 127}; and Is unbalanced: {0, 1}. Hence for each of the dataset that is specific to a combination of cell and target frequency, model performance for aforementioned hyperparameter configurations is tried. Distribution features (dataset meta-features) were extracted for all the 95 datasets. The statistical features used were: number of highly correlated features in the input dataset e.g., number of Intra RSRP features that have strong correlation with the INTER_RSRP label; number of principle component analysis (PCA) components that can explain X % variance in the input data; and computed 12 PCA components of the input data as number of input features was different for each dataset and fitted Gama distribution to each of the 12 PCA components. Then the probability distribution parameter values for each of the PCA components was used as distribution features.

Figure 5:
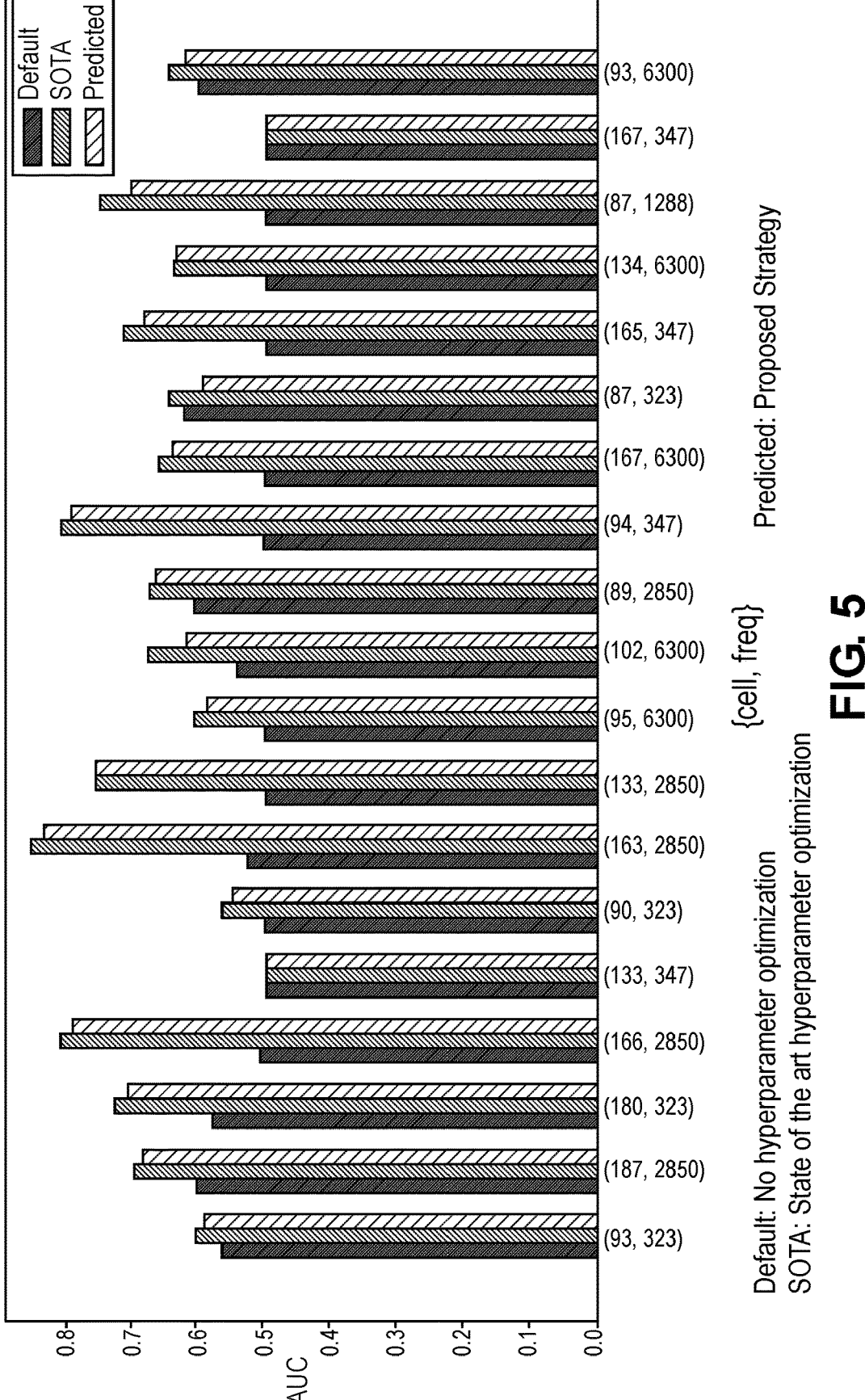
FIG. 5 is a graph of results from an example case application of the embodiments.

The dataset was produced for training and testing of a global hyperparameter ML model wherein the input features were aforementioned dataset statistical features and particular hyperparameter configuration while output label was model performance in terms of area under curve (AUC). For training, 80% of the total 95 cell frequency pair data was used for training global hyperparameter model. Once trained, it was polled by genetic algorithm to find optimal hyperparameters for the unseen (cell, target frequency pair) testing dataset. The results of the example case application of the embodiments, are plotted in FIG. 5 from where it is observed that for most of the cell and target frequency pairs, the embodiments are able to predict hyperparameters very close to actual optimal hyperparameters (SOTA).

The results are tabulated as shown in TABLE I:

TABLE I

| | |
|---|---|
| Mean Squared Error | 0.0009 |
| Root mean squared error | 0.03 |
| R2 Score | 0.9 |
| Explained Variance Score | 0.96 |
| Mean Absolute Error | 0.02 |

Figure 6:
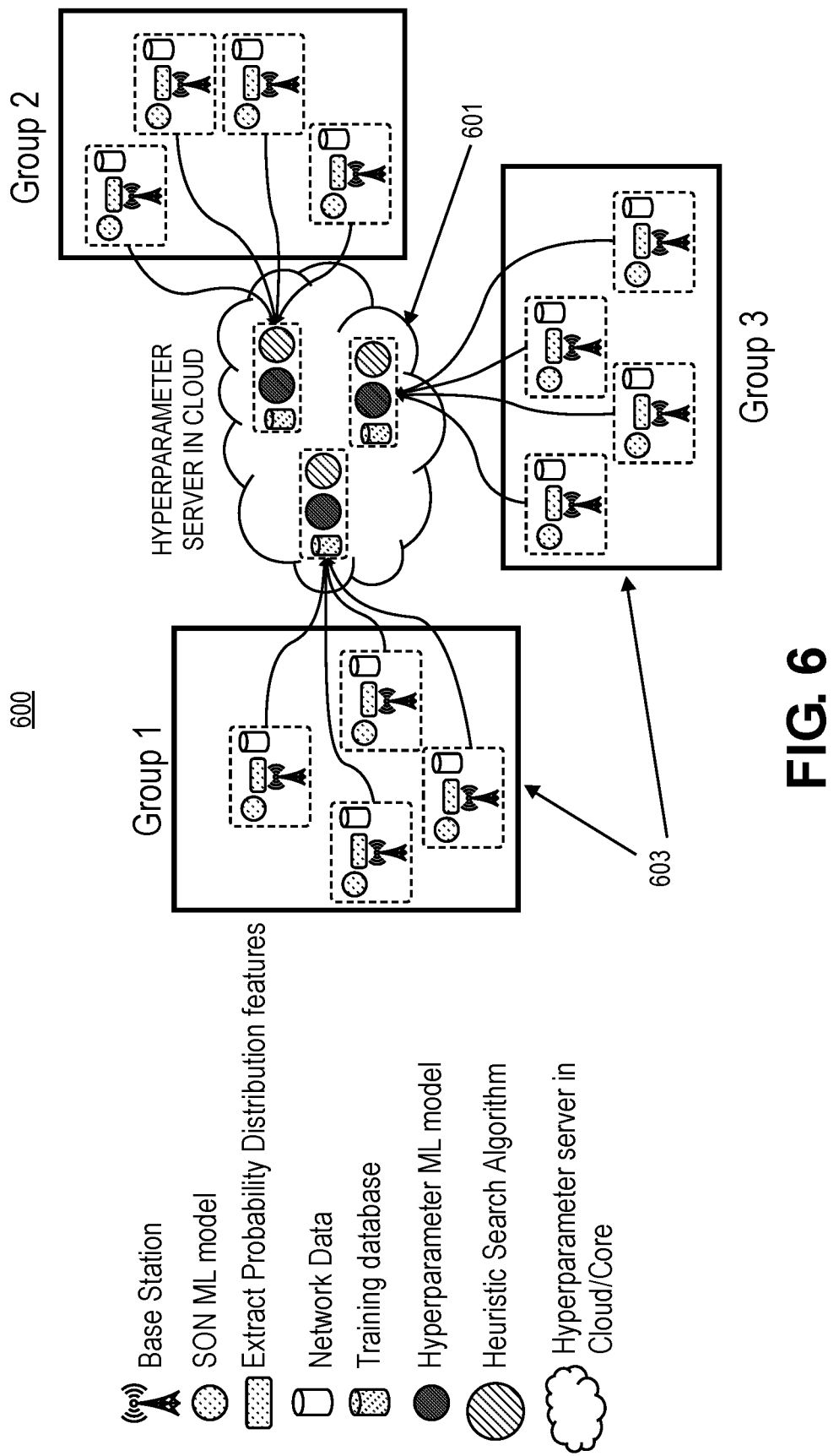
FIG. 6 is a diagram of one example embodiment of a cloud implementation of the hyperparameter optimization process and system.

FIG. 6 is a diagram of on example embodiment of a cloud implementation of the hyperparameter optimization process and system. In the example embodiment, the communication network 600 includes a set of devices (e.g., electronic devices and related resources) in a cloud or core 601 that execute a hyperparameter server. The communication network further includes a set of edge devices (e.g., network devices and related resources) that are in communication with the hyperparameter server in the core or cloud. The cloud or core provides a distributed cloud computing environment in which the hyperparameter server can execute. In some embodiments, the hyperparameter server can establish and maintain a set of clusters that include a training database, shared hyperparameter ML model, and a heuristic algorithm. In other embodiments, these resources are shared across some or all groups of edge devices.

The edge devices can be networking or other electronic devices paired or associated with base stations or similar components of a communication network. Each edge device can include a local (e.g., SON) ML model, probability distribution feature extraction component, and local network data (e.g., local training data. Each edge device is configured by the hyperparameter server to test different hyperparameters via the local ML model, local network data, and configured probability distribution feature extraction. The results of these tests including performance, distribution features, and tested hyperparameters are reported back to the hyperparameter server. The hyperparameter server updates the training database for the associated cluster as well as the shared hyperparameter ML model for the cluster. Edge devices in the cluster can then query the hyperparameter ML model for their cluster to obtain optimized hyperparameters.

FIG. 7A illustrates connectivity between network devices (NDs) within an exemplary network, as well as three exemplary implementations of the NDs, according to some embodiments of the invention. FIG. 7A shows NDs 700A-H, and their connectivity by way of lines between 700A-700B, 700B-700C, 700C-700D, 700D-700E, 700E-700F, 700F-700G, and 700A-700G, as well as between 700H and each of 700A, 700C, 700D, and 700G. These NDs are physical devices, and the connectivity between these NDs can be wireless or wired (often referred to as a link). An additional line extending from NDs 700A, 700E, and 700F illustrates that these NDs act as ingress and egress points for the network (and thus, these NDs are sometimes referred to as edge NDs; while the other NDs may be called core NDs).

Two of the exemplary ND implementations in FIG. 7A are: 1) a special-purpose network device 702 that uses custom application—specific integrated—circuits (ASICs) and a special-purpose operating system (OS); and 2) a general purpose network device 704 that uses common off-the-shelf (COTS) processors and a standard OS.

The special-purpose network device 702 includes networking hardware 710 comprising a set of one or more processor(s) 712, forwarding resource(s) 714 (which typically include one or more ASICs and/or network processors), and physical network interfaces (NIs) 716 (through which network connections are made, such as those shown by the connectivity between NDs 700A-H), as well as non-transitory machine readable storage media 718 having stored therein networking software 720. During operation, the networking software 720 may be executed by the networking hardware 710 to instantiate a set of one or more networking software instance(s) 722. In some embodiments, the networking software 720 can include edge hyperparameter performance tester 765 to implement the embodiments at the edge devices as described herein above. Each of the networking software instance(s) 722, and that part of the networking hardware 710 that executes that network software instance (be it hardware dedicated to that networking software instance and/or time slices of hardware temporally shared by that networking software instance with others of the networking software instance(s) 722), form a separate virtual network element 730A-R. Each of the virtual network element(s) (VNEs) 730A-R includes a control communication and configuration module 732A-R (sometimes referred to as a local control module or control communication module) and forwarding table(s) 734A-R, such that a given virtual network element (e.g., 730A) includes the control communication and configuration module (e.g., 732A), a set of one or more forwarding table(s) (e.g., 734A), and that portion of the networking hardware 710 that executes the virtual network element (e.g., 730A).

The special-purpose network device 702 is often physically and/or logically considered to include: 1) a ND control plane 724 (sometimes referred to as a control plane) comprising the processor(s) 712 that execute the control communication and configuration module(s) 732A-R; and 2) a ND forwarding plane 726 (sometimes referred to as a forwarding plane, a data plane, or a media plane) comprising the forwarding resource(s) 714 that utilize the forwarding table(s) 734A-R and the physical NIs 716. By way of example, where the ND is a router (or is implementing routing functionality), the ND control plane 724 (the processor(s) 712 executing the control communication and configuration module(s) 732A-R) is typically responsible for participating in controlling how data (e.g., packets) is to be routed (e.g., the next hop for the data and the outgoing physical NI for that data) and storing that routing information in the forwarding table(s) 734A-R, and the ND forwarding plane 726 is responsible for receiving that data on the physical NIs 716 and forwarding that data out the appropriate ones of the physical NIs 716 based on the forwarding table(s) 734A-R.

FIG. 7B illustrates an exemplary way to implement the special-purpose network device 702 according to some embodiments of the invention. FIG. 7B shows a special-purpose network device including cards 738 (typically hot pluggable). While in some embodiments the cards 738 are of two types (one or more that operate as the ND forwarding plane 726 (sometimes called line cards), and one or more that operate to implement the ND control plane 724 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 736 (e.g., a first full mesh coupling the line cards and a second full mesh coupling all of the cards).

Returning to FIG. 7A, the general purpose network device 704 includes hardware 740 comprising a set of one or more processor(s) 742 (which are often COTS processors) and physical NIs 746, as well as non-transitory machine readable storage media 748 having stored therein software 750. During operation, the processor(s) 742 execute the software 750 to instantiate one or more sets of one or more applications 764A-R. In some embodiments, the software 750 can include edge hyperparameter performance tester 765 to implement the embodiments at the edge devices as described herein above. While one embodiment does not implement virtualization, alternative embodiments may use different forms of virtualization. For example, in one such alternative embodiment the virtualization layer 754 represents the kernel of an operating system (or a shim executing on a base operating system) that allows for the creation of multiple instances 762A-R called software containers that may each be used to execute one (or more) of the sets of applications 764A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 754 represents a hypervisor (sometimes referred to as a virtual machine monitor (VMM)) or a hypervisor executing on top of a host operating system, and each of the sets of applications 764A-R is run on top of a guest operating system within an instance 762A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 740, directly on a hypervisor (in which case the unikernel is sometimes described as running within a LibOS virtual machine), or in a software container, embodiments can be implemented fully with unikernels running directly on a hypervisor represented by virtualization layer 754, unikernels running within software containers represented by instances 762A-R, or as a combination of unikernels and the above-described techniques (e.g., unikernels and virtual machines both run directly on a hypervisor, unikernels and sets of applications that are run in different software containers).

The instantiation of the one or more sets of one or more applications 764A-R, as well as virtualization if implemented, are collectively referred to as software instance(s) 752. Each set of applications 764A-R, corresponding virtualization construct (e.g., instance 762A-R) if implemented, and that part of the hardware 740 that executes them (be it hardware dedicated to that execution and/or time slices of hardware temporally shared), forms a separate virtual network element(s) 760A-R.

The virtual network element(s) 760A-R perform similar functionality to the virtual network element(s) 730A-R—e.g., similar to the control communication and configuration module(s) 732A and forwarding table(s) 734A (this virtualization of the hardware 740 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 762A-R corresponding to one VNE 760A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 762A-R to VNEs also apply to embodiments where such a finer level of granularity and/or unikernels are used.

In certain embodiments, the virtualization layer 754 includes a virtual switch that provides similar forwarding services as a physical Ethernet switch. Specifically, this virtual switch forwards traffic between instances 762A-R and the physical NI(s) 746, as well as optionally between the instances 762A-R; in addition, this virtual switch may enforce network isolation between the VNEs 760A-R that by policy are not permitted to communicate with each other (e.g., by honoring virtual local area networks (VLANs)).

The third exemplary ND implementation in FIG. 7A is a hybrid network device 706, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 702) could provide for para-virtualization to the networking hardware present in the hybrid network device 706.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 730A-R, VNEs 760A-R, and those in the hybrid network device 706) receives data on the physical NIs (e.g., 716, 746) and forwards that data out the appropriate ones of the physical NIs (e.g., 716, 746). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

FIG. 7C illustrates various exemplary ways in which VNEs may be coupled according to some embodiments of the invention. FIG. 7C shows VNEs 770A.1-770A.P (and optionally VNEs 770A.Q-770A.R) implemented in ND 700A and VNE 770H.1 in ND 700H. In FIG. 7C, VNEs 770A.1-P are separate from each other in the sense that they can receive packets from outside ND 700A and forward packets outside of ND 700A; VNE 770A.1 is coupled with VNE 770H.1, and thus they communicate packets between their respective NDs; VNE 770A.2-770A.3 may optionally forward packets between themselves without forwarding them outside of the ND 700A; and VNE 770A.P may optionally be the first in a chain of VNEs that includes VNE 770A.Q followed by VNE 770A.R (this is sometimes referred to as dynamic service chaining, where each of the VNEs in the series of VNEs provides a different service—e.g., one or more layer 4-7 network services). While FIG. 7C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 7A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 7A may also host one or more such servers (e.g., in the case of the general purpose network device 704, one or more of the software instances 762A-R may operate as servers; the same would be true for the hybrid network device 706; in the case of the special-purpose network device 702, one or more such servers could also be run on a virtualization layer executed by the processor(s) 712); in which case the servers are said to be co-located with the VNEs of that ND.

A virtual network is a logical abstraction of a physical network (such as that in FIG. 7A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

FIG. 7D illustrates a network with a single network element on each of the NDs of FIG. 7A, and within this straight forward approach contrasts a traditional distributed approach (commonly used by traditional routers) with a centralized approach for maintaining reachability and forwarding information (also called network control), according to some embodiments of the invention. Specifically, FIG. 7D illustrates network elements (NEs) 770A-H with the same connectivity as the NDs 700A-H of FIG. 7A.

FIG. 7D illustrates that the distributed approach 772 distributes responsibility for generating the reachability and forwarding information across the NEs 770A-H; in other words, the process of neighbor discovery and topology discovery is distributed.

For example, where the special-purpose network device 702 is used, the control communication and configuration module(s) 732A-R of the ND control plane 724 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 770A-H (e.g., the processor(s) 712 executing the control communication and configuration module(s) 732A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 724. The ND control plane 724 programs the ND forwarding plane 726 with information (e.g., adjacency and route information) based on the routing structure(s). For example, the ND control plane 724 programs the adjacency and route information into one or more forwarding table(s) 734A-R (e.g., Forwarding Information Base (FIB), Label Forwarding Information Base (LFIB), and one or more adjacency structures) on the ND forwarding plane 726. For layer 2 forwarding, the ND can store one or more bridging tables that are used to forward data based on the layer 2 information in that data. While the above example uses the special-purpose network device 702, the same distributed approach 772 can be implemented on the general purpose network device 704 and the hybrid network device 706.

FIG. 7D illustrates that a centralized approach 774 (also known as software defined networking (SDN)) that decouples the system that makes decisions about where traffic is sent from the underlying systems that forwards traffic to the selected destination. The illustrated centralized approach 774 has the responsibility for the generation of reachability and forwarding information in a centralized control plane 776 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 776 has a south bound interface 782 with a data plane 780 (sometime referred to the infrastructure layer, network forwarding plane, or forwarding plane (which should not be confused with a ND forwarding plane)) that includes the NEs 770A-H (sometimes referred to as switches, forwarding elements, data plane elements, or nodes). The centralized control plane 776 includes a network controller 778, which includes a centralized reachability and forwarding information module 779 that determines the reachability within the network and distributes the forwarding information to the NEs 770A-H of the data plane 780 over the south bound interface 782 (which may use the OpenFlow protocol). Thus, the network intelligence is centralized in the centralized control plane 776 executing on electronic devices that are typically separate from the NDs. In some embodiments, the operations of the hyperparameter server 781, as described herein above, can be implemented as part of the network controller 778, applications 788 or similar aspect of the centralized approach 774.

For example, where the special-purpose network device 702 is used in the data plane 780, each of the control communication and configuration module(s) 732A-R of the ND control plane 724 typically include a control agent that provides the VNE side of the south bound interface 782. In this case, the ND control plane 724 (the processor(s) 712 executing the control communication and configuration module(s) 732A-R) performs its responsibility for participating in controlling how data (e.g., packets) is to be routed (e.g., the next hop for the data and the outgoing physical NI for that data) through the control agent communicating with the centralized control plane 776 to receive the forwarding information (and in some cases, the reachability information) from the centralized reachability and forwarding information module 779 (it should be understood that in some embodiments of the invention, the control communication and configuration module(s) 732A-R, in addition to communicating with the centralized control plane 776, may also play some role in determining reachability and/or calculating forwarding information—albeit less so than in the case of a distributed approach; such embodiments are generally considered to fall under the centralized approach 774, but may also be considered a hybrid approach).

While the above example uses the special-purpose network device 702, the same centralized approach 774 can be implemented with the general purpose network device 704 (e.g., each of the VNE 760A-R performs its responsibility for controlling how data (e.g., packets) is to be routed (e.g., the next hop for the data and the outgoing physical NI for that data) by communicating with the centralized control plane 776 to receive the forwarding information (and in some cases, the reachability information) from the centralized reachability and forwarding information module 779; it should be understood that in some embodiments of the invention, the VNEs 760A-R, in addition to communicating with the centralized control plane 776, may also play some role in determining reachability and/or calculating forwarding information—albeit less so than in the case of a distributed approach) and the hybrid network device 706. In fact, the use of SDN techniques can enhance the NFV techniques typically used in the general purpose network device 704 or hybrid network device 706 implementations as NFV is able to support SDN by providing an infrastructure upon which the SDN software can be run, and NFV and SDN both aim to make use of commodity server hardware and physical switches.

FIG. 7D also shows that the centralized control plane 776 has a north bound interface 784 to an application layer 786, in which resides application(s) 788. The centralized control plane 776 has the ability to form virtual networks 792 (sometimes referred to as a logical forwarding plane, network services, or overlay networks (with the NEs 770A-H of the data plane 780 being the underlay network)) for the application(s) 788. Thus, the centralized control plane 776 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 7D shows the distributed approach 772 separate from the centralized approach 774, the effort of network control may be distributed differently or the two combined in certain embodiments of the invention. For example: 1) embodiments may generally use the centralized approach (SDN) 774, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 774, but may also be considered a hybrid approach.

While FIG. 7D illustrates the simple case where each of the NDs 700A-H implements a single NE 770A-H, it should be understood that the network control approaches described with reference to FIG. 7D also work for networks where one or more of the NDs 700A-H implement multiple VNEs (e.g., VNEs 730A-R, VNEs 760A-R, those in the hybrid network device 706). Alternatively or in addition, the network controller 778 may also emulate the implementation of multiple VNEs in a single ND. Specifically, instead of (or in addition to) implementing multiple VNEs in a single ND, the network controller 778 may present the implementation of a VNE/NE in a single ND as multiple VNEs in the virtual networks 792 (all in the same one of the virtual network(s) 792, each in different ones of the virtual network(s) 792, or some combination). For example, the network controller 778 may cause an ND to implement a single VNE (a NE) in the underlay network, and then logically divide up the resources of that NE within the centralized control plane 776 to present different VNEs in the virtual network(s) 792 (where these different VNEs in the overlay networks are sharing the resources of the single VNE/NE implementation on the ND in the underlay network).

On the other hand, FIGS. 7E and 7F respectively illustrate exemplary abstractions of NEs and VNEs that the network controller 778 may present as part of different ones of the virtual networks 792. FIG. 7E illustrates the simple case of where each of the NDs 700A-H implements a single NE 770A-H (see FIG. 7D), but the centralized control plane 776 has abstracted multiple of the NEs in different NDs (the NEs 770A-C and G-H) into (to represent) a single NE 7701 in one of the virtual network(s) 792 of FIG. 7D, according to some embodiments of the invention. FIG. 7E shows that in this virtual network, the NE 7701 is coupled to NE 770D and 770F, which are both still coupled to NE 770E.

FIG. 7F illustrates a case where multiple VNEs (VNE 770A.1 and VNE 770H.1) are implemented on different NDs (ND 700A and ND 700H) and are coupled to each other, and where the centralized control plane 776 has abstracted these multiple VNEs such that they appear as a single VNE 770T within one of the virtual networks 792 of FIG. 7D, according to some embodiments of the invention. Thus, the abstraction of a NE or VNE can span multiple NDs.

While some embodiments of the invention implement the centralized control plane 776 as a single entity (e.g., a single instance of software running on a single electronic device), alternative embodiments may spread the functionality across multiple entities for redundancy and/or scalability purposes (e.g., multiple instances of software running on different electronic devices).

Figure 8:
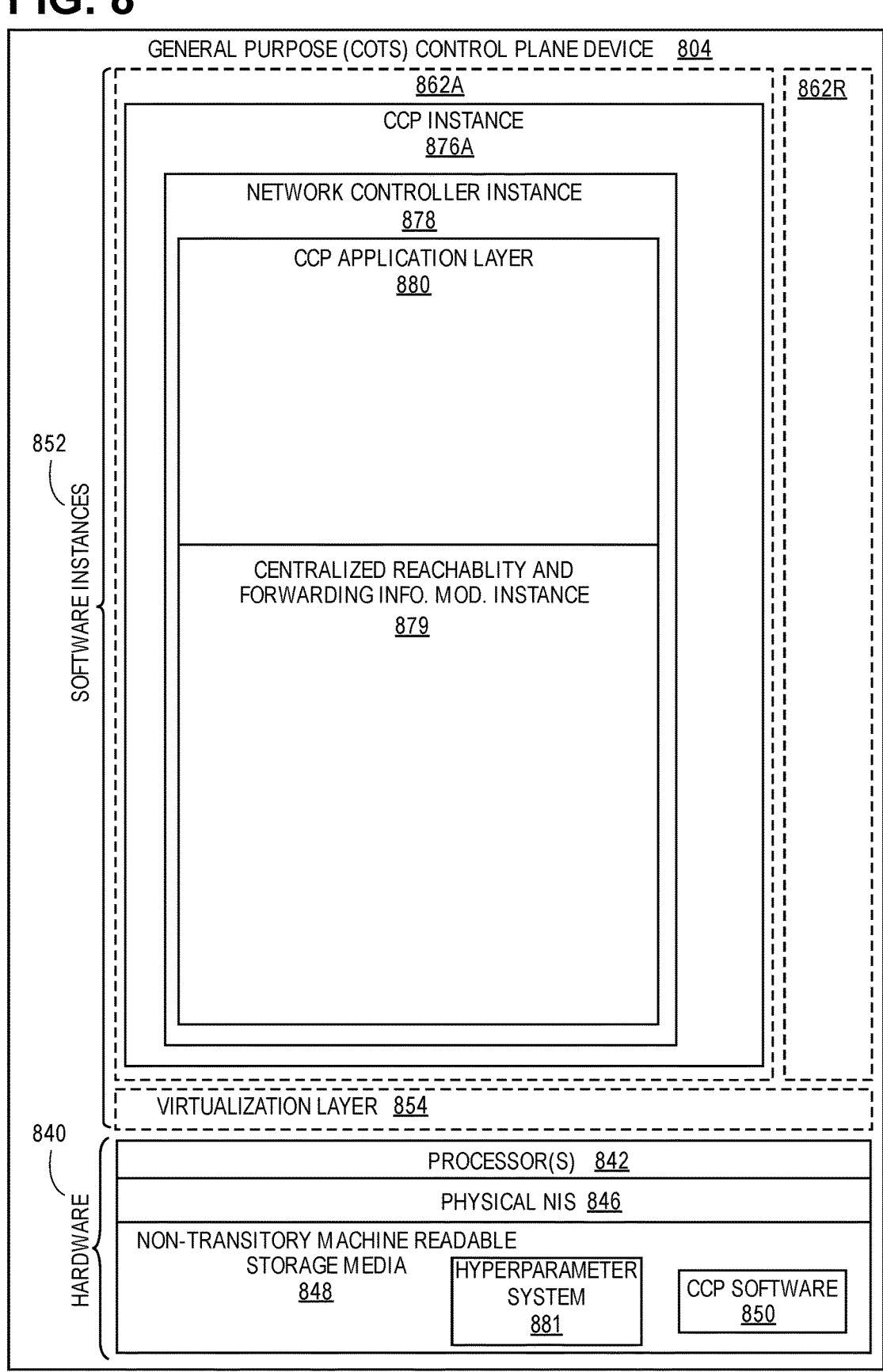
FIG. 8 illustrates a general purpose control plane device with centralized control plane (CCP) software 850), according to some embodiments of the invention.

Similar to the network device implementations, the electronic device(s) running the centralized control plane 776, and thus the network controller 778 including the centralized reachability and forwarding information module 779, may be implemented a variety of ways (e.g., a special purpose device, a general-purpose (e.g., COTS) device, or hybrid device). These electronic device(s) would similarly include processor(s), a set or one or more physical NIs, and a non-transitory machine-readable storage medium having stored thereon the centralized control plane software. For instance, FIG. 8 illustrates, a general purpose control plane device 804 including hardware 840 comprising a set of one or more processor(s) 842 (which are often COTS processors) and physical NIs 846, as well as non-transitory machine readable storage media 848 having stored therein centralized control plane (CCP) software 850. In some embodiments, non-transitory machine readable storage media 848 can store hyperparameter server 881 to implement the embodiments at the hyperparameter server as described herein above at the control plane device 804.

In embodiments that use compute virtualization, the processor(s) 842 typically execute software to instantiate a virtualization layer 854 (e.g., in one embodiment the virtualization layer 854 represents the kernel of an operating system (or a shim executing on a base operating system) that allows for the creation of multiple instances 862A-R called software containers (representing separate user spaces and also called virtualization engines, virtual private servers, or jails) that may each be used to execute a set of one or more applications; in another embodiment the virtualization layer 854 represents a hypervisor (sometimes referred to as a virtual machine monitor (VMM)) or a hypervisor executing on top of a host operating system, and an application is run on top of a guest operating system within an instance 862A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 840, directly on a hypervisor represented by virtualization layer 854 (in which case the unikernel is sometimes described as running within a LibOS virtual machine), or in a software container represented by one of instances 862A-R). Again, in embodiments where compute virtualization is used, during operation an instance of the CCP software 850 (illustrated as CCP instance 876A) is executed (e.g., within the instance 862A) on the virtualization layer 854. In embodiments where compute virtualization is not used, the CCP instance 876A is executed, as a unikernel or on top of a host operating system, on the "bare metal" general purpose control plane device 804. The instantiation of the CCP instance 876A, as well as the virtualization layer 854 and instances 862A-R if implemented, are collectively referred to as software instance(s) 852.

In some embodiments, the CCP instance 876A includes a network controller instance 878. The network controller instance 878 includes a centralized reachability and forwarding information module instance 879 (which is a middleware layer providing the context of the network controller 778 to the operating system and communicating with the various NEs), and an CCP application layer 880 (sometimes referred to as an application layer) over the middleware layer (providing the intelligence required for various network operations such as protocols, network situational awareness, and user—interfaces). At a more abstract level, this CCP application layer 880 within the centralized control plane 776 works with virtual network view(s) (logical view(s) of the network) and the middleware layer provides the conversion from the virtual networks to the physical view.

The centralized control plane 776 transmits relevant messages to the data plane 780 based on CCP application layer 880 calculations and middleware layer mapping for each flow. A flow may be defined as a set of packets whose headers match a given pattern of bits; in this sense, traditional IP forwarding is also flow—based forwarding where the flows are defined by the destination IP address for example; however, in other implementations, the given pattern of bits used for a flow definition may include more fields (e.g., 10 or more) in the packet headers. Different NDs/NEs/VNEs of the data plane 780 may receive different messages, and thus different forwarding information. The data plane 780 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 780, the packet (or a subset of the packet header and content) is typically forwarded to the centralized control plane 776. The centralized control plane 776 will then program forwarding table entries into the data plane 780 to accommodate packets belonging to the flow of the unknown packet. Once a specific forwarding table entry has been programmed into the data plane 780 by the centralized control plane 776, the next packet with matching credentials will match that forwarding table entry and take the set of actions associated with that matched entry.

For example, while the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method of a hyperparameter server to improve hyperparameter search efficiency for devices in a self-organizing network associated with a communication network, where hyperparameters have values that are set prior to training a machine learning model and that affect the training of the machine learning model, and where the self-organizing network is a network that can configure, optimize and heal itself through automated processes, the method comprising:

sending configuration for data feature collection to a plurality of edge devices in the self-organizing network, wherein the plurality of edge devices are grouped into a cluster of edge devices comprised of base stations having identified commonalities among the base stations;

receiving hyperparameter performance data from the edge devices that are based training a machine learning model at the edge devices based on the configuration; and training a shared hyperparameter machine learning model using a global training database including the hyperparameter performance data to identify optimal hyperparameters for use by at least one edge device of the cluster.

2. The method of claim 1, further comprising:
adding the hyperparameter performance data to the global training database.

3. The method of claim 1, further comprising:
servicing a hyperparameter query from the at least one edge device using the shared hyperparameter machine learning model after updating by the training.

4. The method of claim 1, wherein the hyperparameter performance data includes a tuple of probability distribution, hyperparameter settings, and performance metrics.

5. The method of claim 1, further comprising:
establishing the cluster with a shared hyperparameter machine learning model and training database for the cluster.

6. A method of an edge device of a communication network to improve efficiency for a hyperparameter search for devices in a self-organizing network associated with the communication network, where the hyperparameter search is for hyperparameters for a machine learning model for the self-organizing network, where hyperparameters have values that are set prior to training the machine learning model and that affect the training of the machine learning model, and where the self-organizing network is a network that can configure, optimize and heal itself through automated processes using the machine learning model the method comprising:

receiving configuration for data feature collection from a hyperparameter server, wherein the configuration for data feature collection is sent to a plurality of edge devices in the self-organizing network, wherein the plurality of edge devices are grouped into a cluster of edge devices comprised of base stations having identified commonalities among the base stations and wherein the edge device comprises a base station within the cluster;

training an edge machine learning model using local training data and selected hyperparameters from the configuration; and sending hyperparameter performance data to the hyperparameter server obtained from the training of the edge machine learning model for the hyperparameter server to train a shared hyperparameter machine learning model using a global training database including the hyperparameter performance data to identify optimal hyperparameters for use by the edge device.

7. The method of claim 6, further comprising:
collecting data features according to the configuration.

8. The method of claim 6, further comprising:
sending a hyperparameter query to the hyperparameter server to obtain optimized hyperparameters from a shared hyperparameter machine learning model.

9. The method of claim 6, wherein the hyperparameter performance data includes a tuple of probability distribution, hyperparameter settings, and performance metrics.

10. A non-transitory machine-readable storage medium that provides instructions that, if executed by a processor, will cause said processor to perform a set of operations for hyperparameter determination for a machine learning model for a self-organizing network associated with a communication network, where hyperparameters have values that are set prior to training the machine learning model and that affect the training of the machine learning model, and where the self-organizing network is a network that can configure, optimize and heal itself through automated processes using the machine learning model, the set of operations comprising:

sending configuration for data feature collection to a plurality of edge devices in the self-organizing network, wherein the plurality of edge devices are grouped into a cluster of edge devices comprised of base stations having identified commonalities among the base stations;

receiving hyperparameter performance data from the edge devices that are based training a machine learning model at the edge devices based on the configuration; and training a shared hyperparameter machine learning model using a global training database including the hyperparameter performance data to identify optimal hyperparameters for use by at least one edge device of the cluster.

11. The non-transitory machine-readable storage medium of claim 10, the set of operations further comprising:

adding the hyperparameter performance data to the global training database.

12. The non-transitory machine-readable storage medium of claim 10, the set of operations further comprising:

servicing a hyperparameter query from the at least one edge device using the shared hyperparameter machine learning model after updating by the training.

13. The non-transitory machine-readable storage medium of claim 10, wherein the hyperparameter performance data includes a tuple of probability distribution, hyperparameter settings, and performance metrics.

14. The non-transitory machine-readable storage medium of claim 10, the set of operations further comprising:

establishing the cluster with a shared hyperparameter machine learning model and training database for the cluster.

15. A non-transitory machine-readable storage medium that provides instructions that, if executed by a processor associated with an edge device, will cause said processor to perform a set of operations for hyperparameter determina-tion for a machine learning model for a self-organizing network associated with a communication network, where hyperparameters have values that are set prior to training the machine learning model and that affect the training of the machine learning model, and where the self-organizing network is a network that can configure, optimize and heal itself through automated processes using the machine learning model, the set of operations comprising:

receiving configuration for data feature collection from a hyperparameter server, wherein the configuration for data feature collection is sent to a plurality of edge devices in the self-organizing network, wherein the plurality of edge devices are grouped into a cluster of edge devices comprised of base stations having identified commonalities among the base stations and wherein the edge device comprises a base station within the cluster;

training an edge machine learning model using local training data and selected hyperparameters from the configuration; and sending hyperparameter performance data to the hyperparameter server obtained from the training of the edge machine learning model for the hyperparameter server to train a shared hyperparameter machine learning model using a global training database including the hyperparameter performance data to identify optimal hyperparameters for use by the edge device.

16. The non-transitory machine-readable storage medium of claim 15, the set of operations further comprising:

collecting data features according to the configuration.

17. The non-transitory machine-readable storage medium of claim 15, the set of operations further comprising:

sending a hyperparameter query to the hyperparameter server to obtain optimized hyperparameters from a shared hyperparameter machine learning model.

18. The non-transitory machine-readable storage medium of claim 15, wherein the hyperparameter performance data includes a tuple of probability distribution, hyperparameter settings, and performance metrics.

* * * * *